United States Patent [19]

Lunz et al.

[11] Patent Number: 5,164,895
[45] Date of Patent: Nov. 17, 1992

[54] NEUTRON FLUX MAPPING SYSTEM FOR NUCLEAR REACTORS

[75] Inventors: Kenneth G. Lunz, Fox Chapel; Kevin P. Litzinger, Level Green, both of Pa.

[73] Assignee: Westinghouse Electric Corp., Pittsburgh, Pa.

[21] Appl. No.: 494,465

[22] Filed: Mar. 16, 1990

[51] Int. Cl.⁵ .................................... G06F 14/46
[52] U.S. Cl. ............................ 364/138; 364/131; 364/140; 340/825.06; 376/254
[58] Field of Search ............. 364/138, 131, 132, 140, 364/146, 184, 492, 494, 495; 376/254; 340/825.06

[56] References Cited

U.S. PATENT DOCUMENTS

| | | | |
|---|---|---|---|
| 3,147,370 | 9/1964 | Lowman | 364/138 |
| 3,842,249 | 10/1974 | Geyer et al. | 364/138 |
| 4,161,027 | 7/1979 | Russel | 364/492 |
| 4,255,234 | 3/1981 | Neuner et al. | 176/19 R |
| 4,268,354 | 5/1981 | Wassel et al. | 176/19 EC |
| 4,582,672 | 4/1986 | Tuley, Jr. et al. | 376/254 |
| 4,602,343 | 7/1986 | Dougherty | 364/505 |
| 4,689,736 | 8/1987 | Glaudel et al. | 364/140 |
| 4,791,547 | 12/1988 | Petroff | 364/138 |
| 4,803,039 | 2/1989 | Impink, Jr. | 376/216 |
| 4,823,283 | 4/1989 | Diehm et al. | 364/518 |

FOREIGN PATENT DOCUMENTS

| | | |
|---|---|---|
| 3842467 | 6/1989 | Fed. Rep. of Germany . |
| 2438895 | 5/1980 | France . |
| 2022870 | 12/1979 | United Kingdom . |

OTHER PUBLICATIONS

"Brochure for Digital flux mapping system" from Westinghouse Nuclear Services Integration Division.
Wassel et al., "A microprocessor based automatic flux mapping system for pressurized water reactors", IEEE Transactions on Nuclear Science, vol. NS-26, No. 1, Feb. 1979.
Dobbeni, D., "Applying Eddy Current Testing to In-core Instrument Thimbles", vol. 32, No. 393, Apr. 1987, pp. 62-63.
Dobbeni, D., "Applying Eddy Current Testing to In-core Instrument Thimbles", vol. 32, No. 393, Apr. 1987, pp. 62-63.

*Primary Examiner*—Jerry Smith
*Assistant Examiner*—Paul Gordon

[57] ABSTRACT

A plurality of flux map sequences are stored in nonvolatile memory to control a flux mapping operation in a nuclear reactor. The flux map sequences are accessed by a host controller which receives instructions from either a local man machine interface or a remote man machine interface. A system control unit determines which of the man machine interfaces is active and also provides the ability to select manual control of detector drivers. A selected flux map sequence is displayed and can be modified and then restored or executed. The modifications to the flux map sequence may include deleting a detector driver from the flux mapping operation and then automatically redistributing the thimbles originally used by the deleted detector driver to be used by the remaining detector drivers. The man machine interfaces are preferably independent computer systems each connected to receive shared data transmitted from the host controller and capable of performing analysis on the flux map data including generating calibration data for a plant protection system. The flux mapping system also includes a diagnostic processor for monitoring the operation of the host controller and ensuring that the detector drivers receive instructions to return to a safe condition if there is a malfunction of the host controller.

15 Claims, 8 Drawing Sheets

NEUTRON FLUX MAPPING SYSTEM FOR NUCLEAR REACTORS

BACKGROUND OF THE INVENTION

1. Field of the Invention

The present invention relates to flux mapping systems for nuclear reactors and, more particularly, to a flexible and highly reliable flux mapping system with a simple architecture.

2. Description of the Related Art

Nuclear reactors include incore and excore detectors, i.e., detectors which are positioned inside the nuclear reactor core and detectors which are outside the core but inside the containment. Flux detectors, for example, may be used both inside the core and outside the core. In both cases, the flux detectors measure neutron flux emanating from the fuel in the core. The incore flux detectors are inserted into thimbles which pass through the core. The incore flux detectors are then drawn out of the core at a predetermined rate to produce a flux map along each thimble.

A pressurized water nuclear reactor typically has approximately sixty thimbles, but may have only four detectors. Multiple-path selectors are used to route the detectors into the thimbles. All or a portion, e.g., a quadrant, of the core may be mapped at a given time. Typically, all, e.g., four detectors are inserted into different thimbles simultaneously so that the map can be produced as quickly as possible while conditions in the core undergo little change.

Prior art flux mapping control systems were completely custom designed computer systems with high reliability to ensure that the flux mapping operation was being performed correctly. However, such systems were sometimes designed with excessively tight parameters, so that at times no flux mapping could be performed, even one with somewhat suspect results. In addition, changes to the parameters often required programming changes which could only be performed by the manufacturer of the flux mapping system and not by the operator. As a result, prior art flux mapping systems often provided lower availability than desired.

SUMMARY OF THE INVENTION

An object of the present invention is to provide a flux mapping system capable of using different flux map sequences.

Another object of the present invention is to provide a flux mapping system capable of quickly and efficiently performing a flux mapping operation when one or more detector drivers is unavailable.

Yet another object of the present invention is to provide a flux mapping system capable of being controlled from more than one location.

A further object of the present invention is to provide a flux mapping system capable of outputting both analog and digital data, including status information, during the flux mapping operation.

A yet further object of the present invention is to provide a flux mapping system capable of executing programs analyzing the flux mapping data and generating calibration data for a plant protection system.

The above objects are attained by providing a method for controlling flux mapping of a nuclear reactor, comprising the steps of: storing a plurality of flux map sequences in nonvolatile memory; selecting one of the flux map sequences; and controlling a flux mapping operation in dependence upon the one of the flux mapping sequences selected in the previous step. Preferably, the flux mapping system is a computer system for controlling a physical process, such as flux mapping. The computer system includes host control means and inputs and outputting signals, including outputting automated control signals to the physical process and inputting process data signals representing conditions related to the physical process. Also included in the computer system are local and remote operator interface means. The local operator interface means is disposed in physical proximity to the host control means and inputs local operator instructions from a local operator and shared data signals included in the signals output by the host control means. The local operator interface means outputs the operator instructions to the host control means and display data, included in the shared data, to the local operator. The remote operator interface means is separate from the host control means and the local operator interface means and is provided for inputting remote operator instructions from a remote operator and the shared data signals from the host control means. The remote operator interface means outputs the remote operator instructions to the host controller means and the display data to the remote operator. The computer system is controlled by system control means for permitting only one of the local and remote operator instructions to be received by the host control means at any given time.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENT

Figure 1:
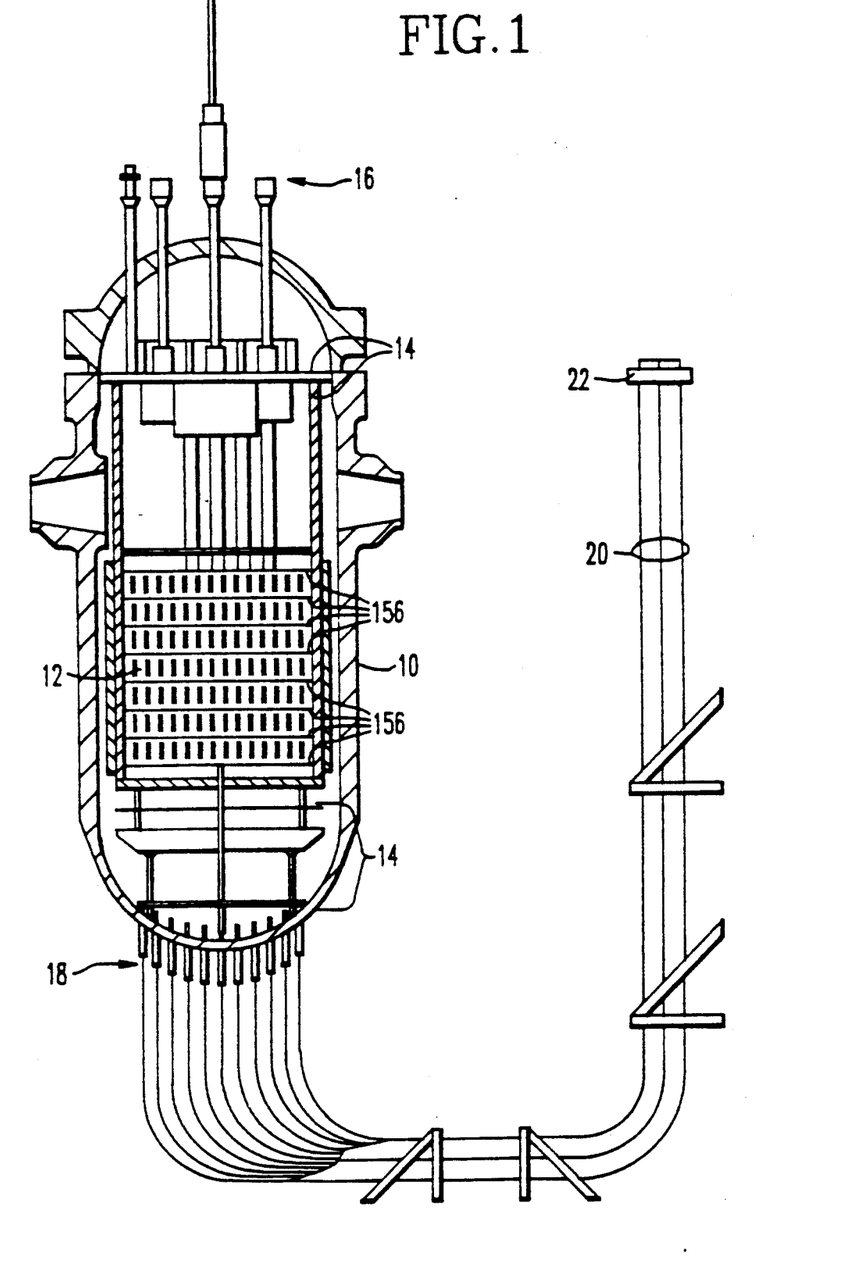
FIG. 1 is a schematic diagram of a nuclear reactor including an illustration of thimble guides.
Figure 2A:
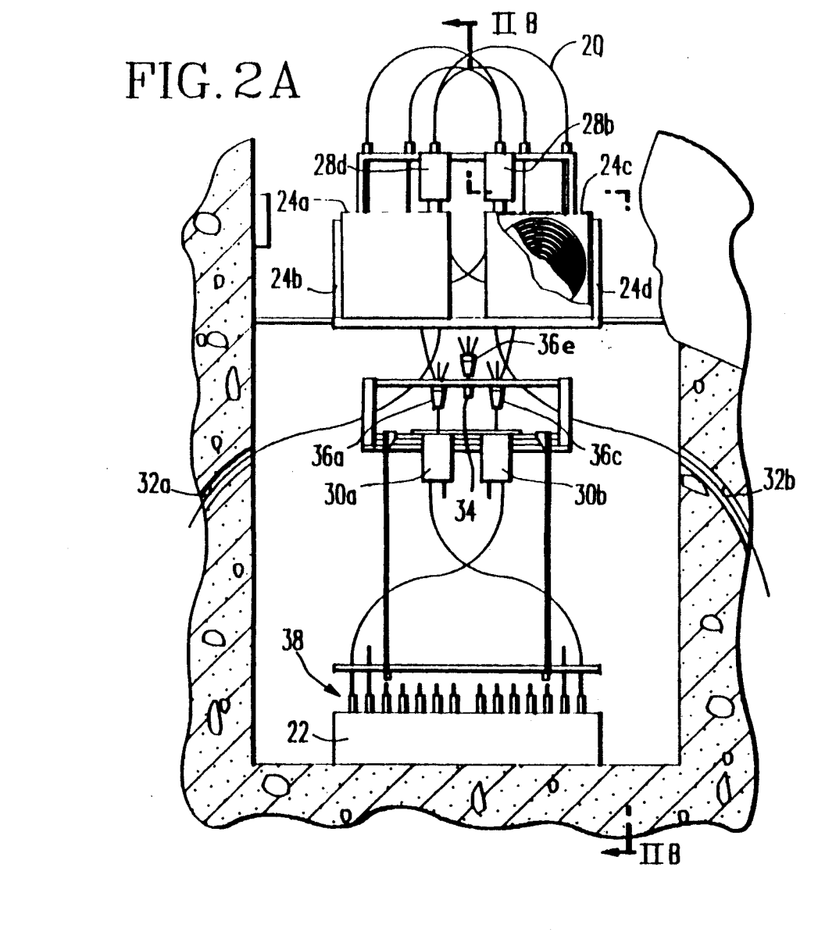
FIGS. 2A and 2B are front and side views of a detector drive system for a flux mapping system.

As illustrated in FIG. 1, a nuclear reactor vessel 10 contains a fuel assembly (core) 12 and support structures 14. Various instrumentation and drive devices 16 penetrate the vessel 10 from above. Thimble guide tubes 18 penetrate the vessel 10 from below. The detector cables 20 run from a seal table 22 to the thimble guide tubes 18 when mapping the core 12 of the reactor. As illustrated in FIG. 2A, four detector drivers 24a–24d drive detector cables 20 into four corresponding 6-path selectors 28a–28d (selector 28a corresponding to driver 24a is not illustrated in FIG. 3B). Each 6-path selector 28 selects one of four 15-path selectors 30a–30d (selector 30d is illustrated in FIG. 3B), or one of four detector storage conduits of which two (32a and 32b) are illustrated in FIG. 2A, or a calibration path conduit 34. The detector storage conduits 32 each correspond to one of the detector drivers 24. However, each of the 15-path selectors 30 and the calibration path conduit 34 can receive detectors from any of the four detector drivers 24 via the 6-path selectors 28 and wyes 36a–36e.

Figure 2B:
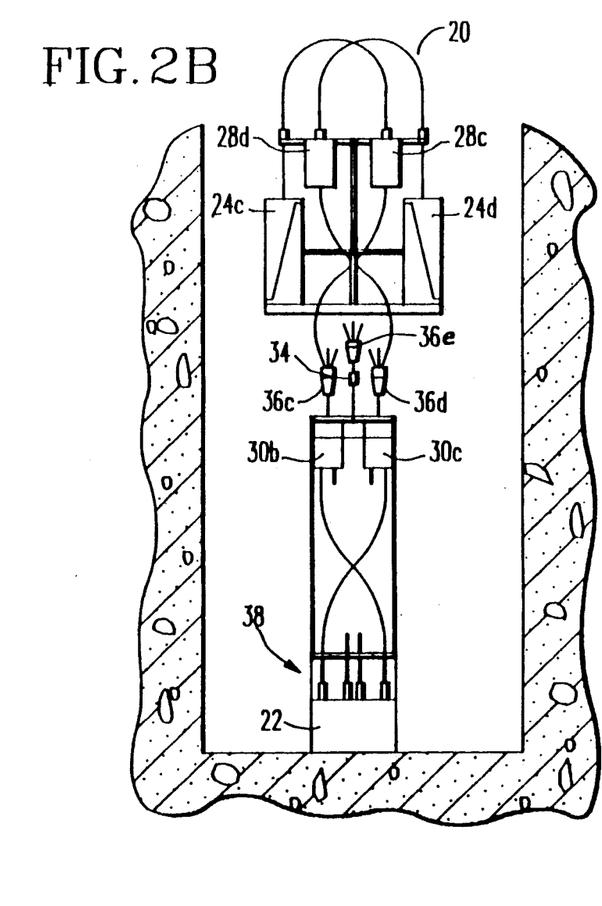

Each 15-path selector 30 can select one of up to 15 thimble guide tubes 38. Thus up to 60 thimbles can be accessed by each detector driver 24 in the flux drive system arrangement illustrated in FIGS. 1, 2A and 2B. As should be readily apparent from FIGS. 1, 2A and 2B, the length of cable required to reach from one of the detector drivers 24 to the top of the thimbles in the reactor 10 varies somewhat depending upon in which thimble the detector is located.

Figure 3A:
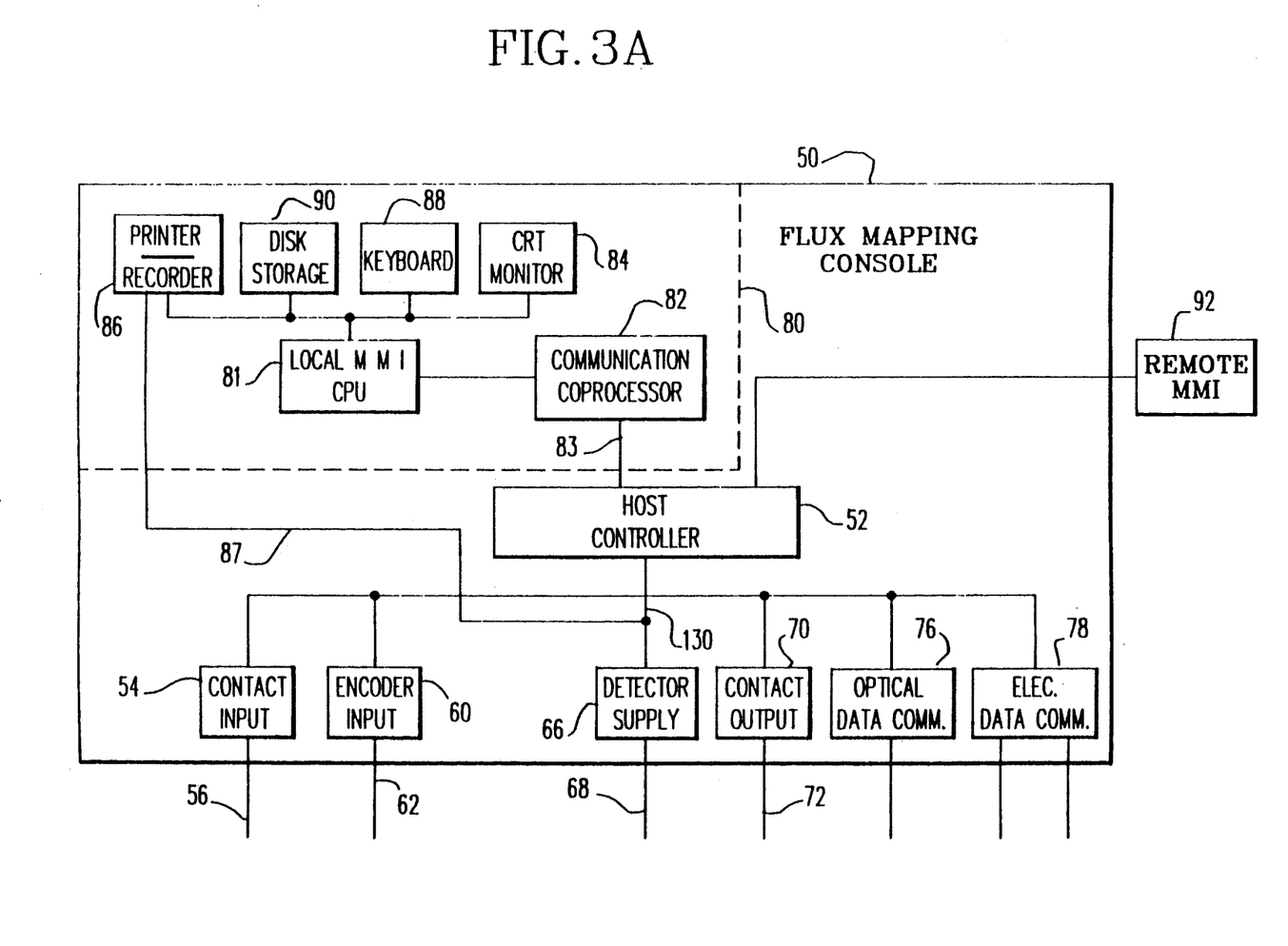
FIGS. 3A and 3B are a block diagram of a flux mapping system according to the present invention.
Figure 3B:
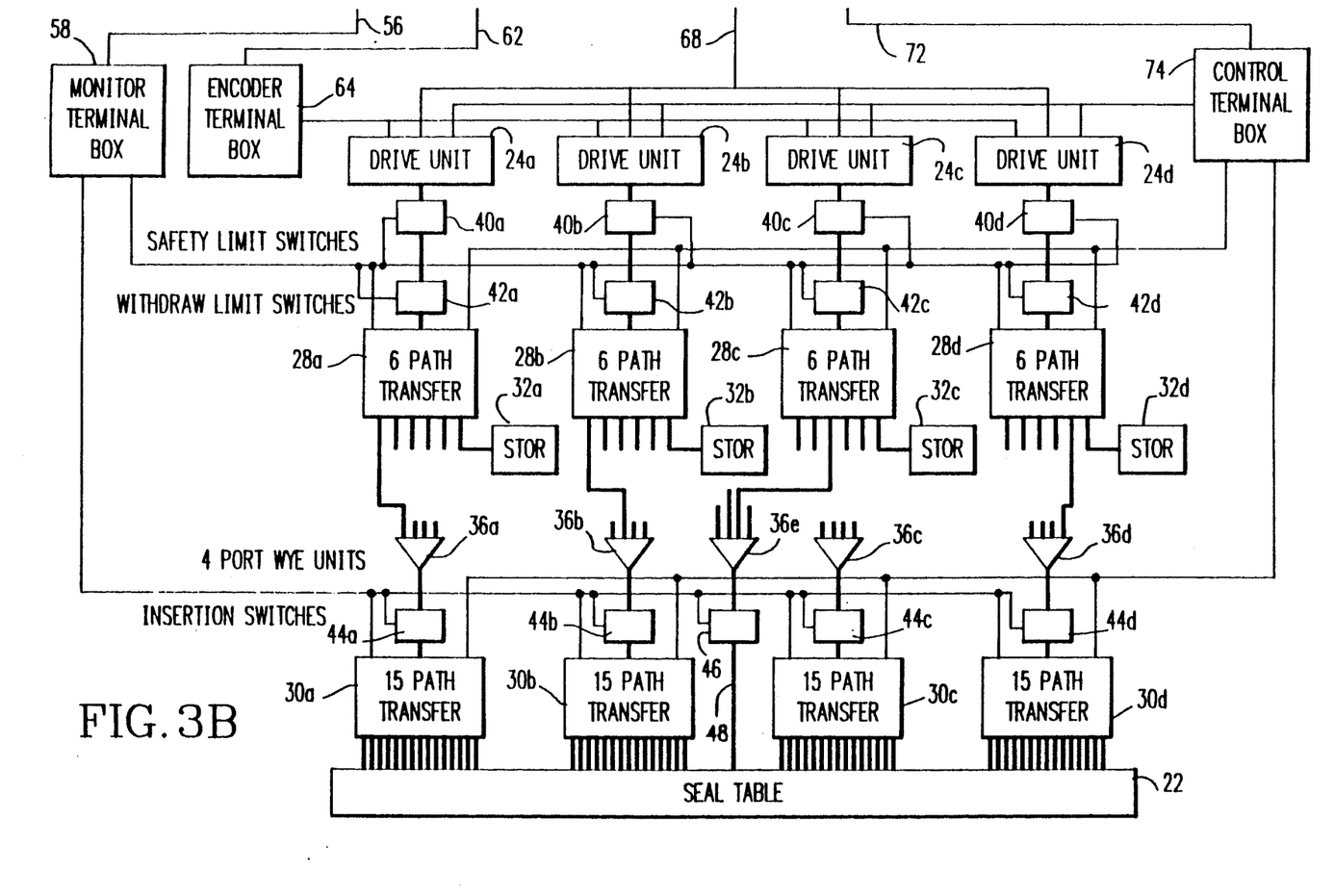

The detector drivers 24 and selectors 28 are part of the flux mapping system illustrated in FIGS. 3A and 3B. As a detector is initially extended from one of the drive units 24, it first passes through one of four safety limit switches 40a–40d and then one of four withdraw limit switches 42a–42d. These limit switches 40, 42 provide verification of position of the detector near the detector drivers 24. Transfer insertion switches 44a–44d indicate when a detector is entering one of the 15 path transfers 30a–30d. A calibration limit switch 46 provides an indication of the presence of a detector along the calibration path 48.

A flux mapping system according to the present invention is controlled by a flux mapping console 50, illustrated in FIG. 3A. The heart of the flux mapping console is a host controller 52 which inputs and outputs signals, including control signals to the electromechanical components illustrated in FIG. 3B. The signals received by the host controller 52 include process data signals representing conditions in the physical part of the flux mapping system. Input and output between the host controller 52 and the components illustrated in FIG. 3B is accomplished via input/output circuits illustrated at the bottom of FIG. 3A.

The input/output circuits in the flux mapping console 50 which communicate between the host controller 52 and the components of the flux mapping system illustrated in FIG. 3B include the following circuits. Contact input circuits 54 are connected via data transmission line 56 and monitor terminal box 58 to the limit switches 40, 42, 44 and the six and 15-path transfer selectors 28, 30. An encoder input unit 60 is connected via data transmission line 62 and encoder terminal box 64 to position encoders in the drive units 24. The detector supply unit 66 is connected via data transmission line 68 to the detectors driven by the drive units 24. The detector supply units 66 supply voltage and read currents output by the detectors, as in a conventional flux mapping system. Contact output unit 70 is connected via data transmission lines 72 and control terminal box 74 to the detector drivers 24 and selectors 28, 30 to control the operation of the motors in these components.

Optical 76 and electrical 78 data communication units provide data communications over optical and electrical transmission means to or from other control systems of the nuclear reactor. For example, conventional primary plant protection systems utilize optical communication means to minimize noise problems and can communicate with the flux mapping systems via the optical data communication unit 76. Furthermore, during a flux mapping operation, it is important to know the position of and any changes in the control rod control system. The electrical data communication unit 78 can be used for this purpose and to communicate with any other systems which use electrical data communications.

In the preferred embodiment, the flux mapping control system includes two operator interface means. One operator interface means or man machine interface (MMI) 80 is disposed in physical proximity to the host controller 52. This local MMI 80 is controlled by a CPU 81 which interfaces with the host controller 52 via communication coprocessor 82 and shared data line 83 to output local operator instructions to the host controller 52 and receive shared data from the host controller 52. The shared data includes display data which is output by the local MMI CPU 81 to a CRT monitor 84 or other display device, such as a plasma screen, etc., and to a printer/recorder unit 86. The printer/recorder 86 is also connected directly to the detector supply 66 via analog data line 87 to obtain analog data to be output under the control of the local MMI CPU 81. The printer/recorder 86 is preferably a single unit capable of operating as a printer/plotter, but may be a combination of hard copy output devices. The local operator instructions are received by a keyboard 88 or other input device, such as a touch screen, mouse, digitizer, etc. The shared data from the host controller 52 can be stored on disk storage 90 which may include a hard disk or a floppy disk drive or both.

Figure 4:
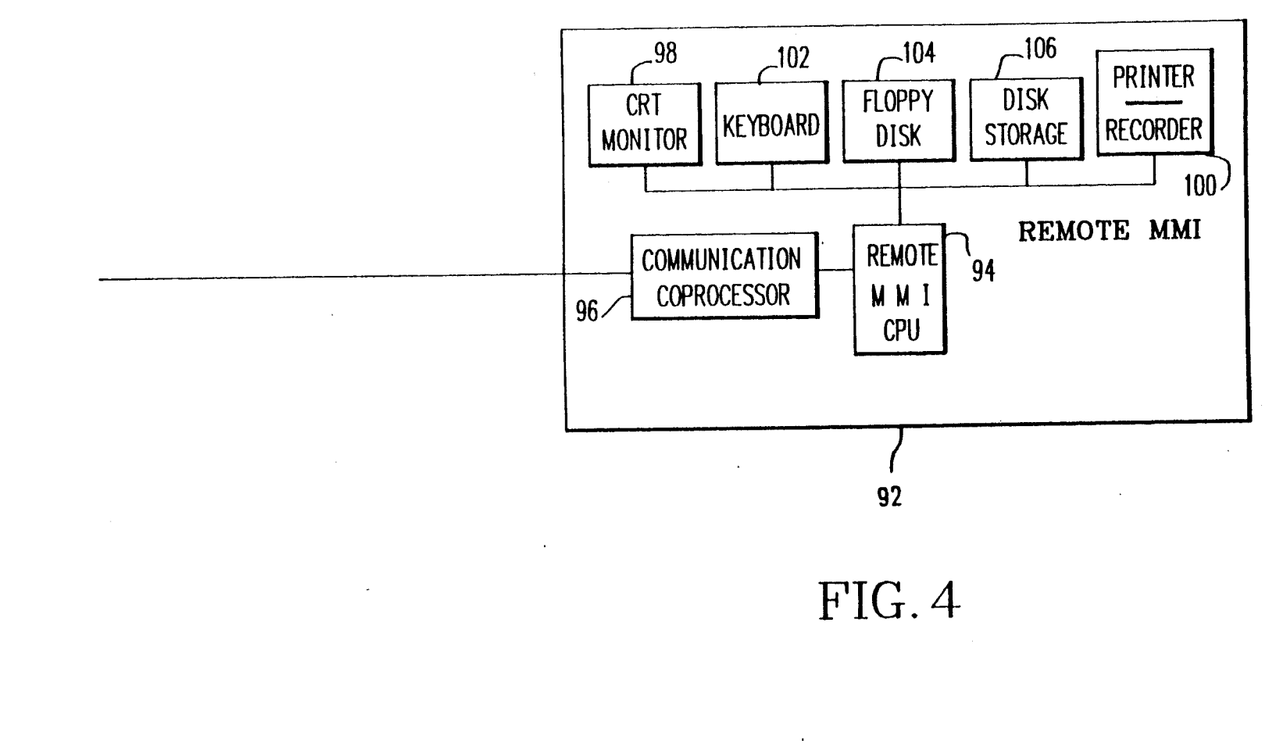
FIG. 4 is a block diagram of a host controller and related components of the flux mapping control system.

In the preferred embodiment, the flux mapping system includes a remote MMI 92 in addition to the local MMI 80. As illustrated in FIG. 4, the remote MMI 92 includes a remote MMI CPU 94, a communication coprocessor 96, a CRT monitor 98, a printer/recorder 100, a keyboard 102 and both a floppy disk drive 104 and hard disk storage 106 which operate in substantially the same manner as described for the local MMI 80. If a floppy disk drive is not included in the disk storage 90 of the local MMI 80, the floppy disk drive 104 in the remote MMI 92 is provided so that shared data including flux map sequences can be stored on a floppy diskette which can be transported to an offsite location for safe storage. The communication coprocessors 82, 96 in the local MMI 80 and remote MMI 92, respectively, preferably receive identical shared data from the host controller 52 and the CPUs 81 and 94 format and display data included in the shared data on the CRT monitors 84, 98.

Figure 5:
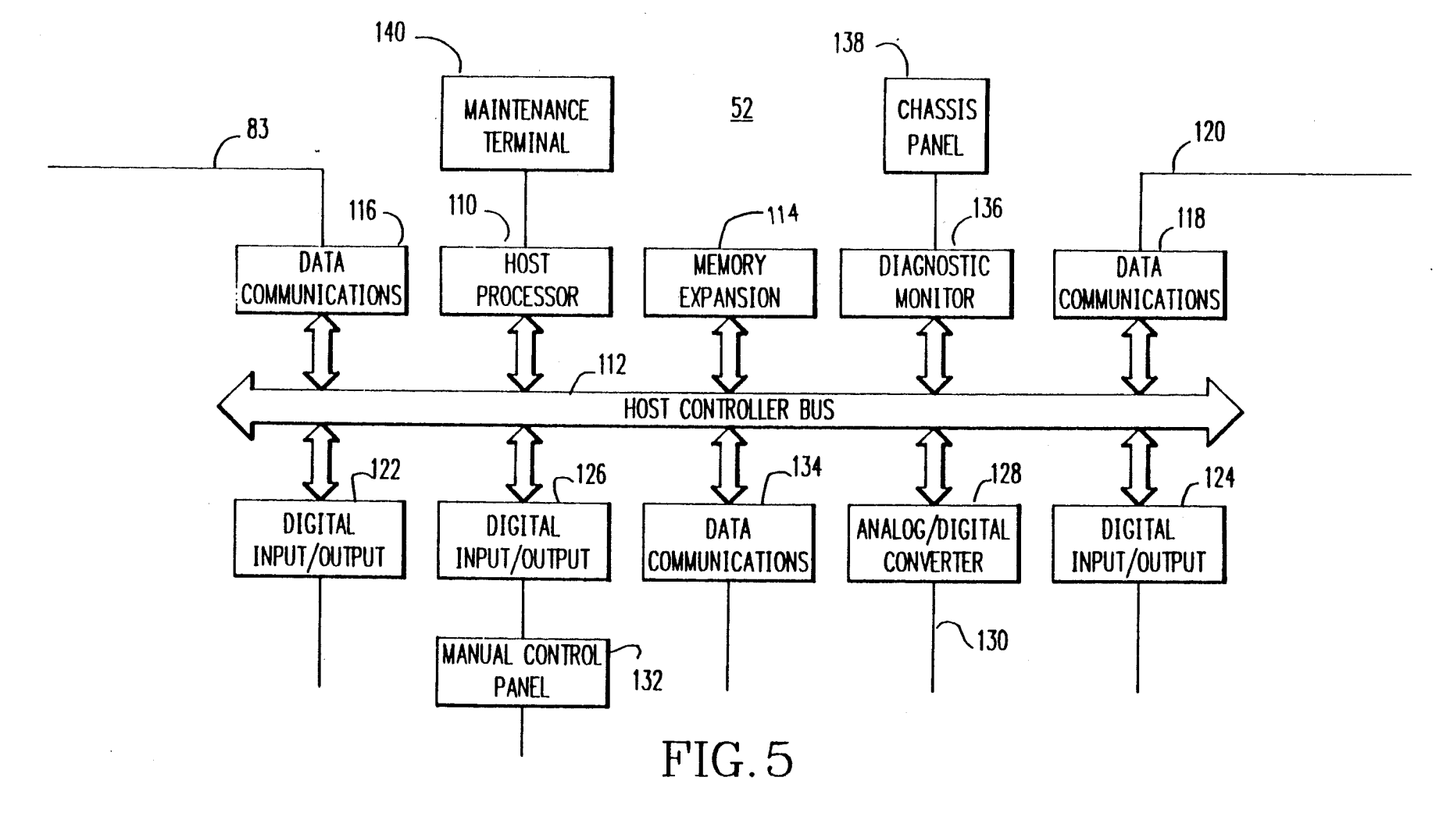
FIG. 5 is a block diagram of a remote operator interface according to the present invention.

The host controller 52 illustrated in FIG. 5 is controlled by a host processor 110 which communicates via a host controller bus 112 with a number of input/output units and memory expansion units 114. The input/output units include data communication units 116, 118 which communicate with the communication coprocessors 82, 96 via shared data lines 83, 120, respectively. Other input/output operations are performed by digital input/output units 122, 124, 126 and an analog/digital converter 128 which provides for input of analog signals. The digital input/output unit 122 is used for communication between the host controller 52 and the contact input unit 54 and contact output unit 70 for communication with the selectors 28, 30. The digital input/output unit 124 communicates with the encoder input unit 60 and detector supply unit 66 to receive data from the encoders in the drive units 24 and to control the detector supply unit 66. The analog/digital converter 128 is connected to receive the voltages and currents from the detector supply unit 66 via analog data line 130. As described above, analog data is also supplied via line 87 directly to the printer/recorder unit 86 in the local MMI 80.

The digital input/output unit 126 is connected via a manual control panel 132 to the contact output unit 70. The manual control panel 132 preferably includes manual control means for generating manual control signals to control the device drivers 24 and switching means for selecting between local, remote and manual operation modes. The manual control means may be toggle switches which generate a signal indicating that a corresponding detector drive should be energized in a forward or reverse direction or should be stopped. The switching control means may be a multiple position switch that connects the toggle switches to the contact output units 70 in the manual control mode and otherwise supplies automated control signals from the host controller 52 to the contact output unit 70. Selection of one of the local and remote modes provides an indication to the host controller 52 to receive data from the corresponding local 81 or remote 92 MMI.

Also connected to the host controller bus 112 are a data communication unit 134 and a diagnostic monitor 136. The data communications unit 134 provides an interface to the optical data communication unit 76 and electrical data communications unit 78. The diagnostic monitor 136 is preferably a processor operating independently from the host processor 110. The diagnostic monitor 136 receives data from a chassis panel 138 indicating temperature at one or more points in the host controller 52 and one or more power levels of power supplies used by the host controller 52. In addition, the diagnostic monitor monitors the signals output by the host processor to determine whether any logic failures occur. If the diagnostic monitor 136 detects any unacceptable temperature or power levels or a logic failure, the diagnostic monitor 136 sends safety shut down control signals to the host controller bus 112 to shut down the host processor 110 and place the devices illustrated in FIG. 3B in a safe state. The host processor 110 may also include diagnostic routines which provide indications of the operation of the host controller to a maintenance terminal 140.

The memory expansion unit 114 preferably includes random access memory (RAM), programmable read only memory (PROM) storing an operating program and electrically erasable programmable read only memory (EEPROM). The EEPROM preferably provides storage for a limits and tolerances and a plurality of flux map sequences that can be accessed by the host processor to generate selector control signals included in the automated control signals output via digital input/output unit 122 to control the selectors 28, 30. Other forms of nonvolatile memory could be used in place of EEPROM, but EEPROM is one of the surest forms of nonvolatile memory. Preferably the programs executed by the host processor 110 and MMI CPUs 81, 94 enable the flux map sequences stored in the EEPROM to be backed up on a removable magnetic medium such as a floppy diskette.

In the preferred embodiment, the local and remote MMIs 80, 92 are preferably commercially available microcomputer systems, such as GEAR BOX 7552 machines. Preferably, these microcomputers are especially constructed or "industrially hardened" to operate in more hostile environments, e.g., over a greater temperature range than conventional office equipment microcomputers. The host controller 52 may be a MULTIBUS computer system using, e.g., INTEL 28612 processor boards for the host processor 110 and diagnostic processor 136. The input/output board illustrated in FIG. 5 may be commercially available MULTIBUS input/output boards. The input/output units at the bottom of FIG. 3A may be conventional input/output circuit boards used in existing flux mapping systems.

Operation of the flux mapping system illustrated in FIGS. 3A-5 is initiated by selecting one of the operation modes on the manual control panel 132. Ordinarily, the local operation mode would be selected enabling local operator instructions to be input via the keyboard 88 or other input device to the host controller 52. When the local operator wishes to perform a flux mapping operation, one of the flux map sequences stored in the EEPROM in the memory expansion unit 114 is selected and may be displayed on the CRT monitor 84. The flux mapping operation can then be initiated and the host controller outputs selector and detector drive control signals in a substantially conventional manner based upon the selected flux map sequence. During the flux mapping operation, status information regarding selector and detector position is preferably displayed on the CRT monitor 84. Also, the man machine interfaces 80, 92 are preferably constructed to permit images of the CRT screens to be output on the printer/recorder units 86, 98. In addition, the printer/recorder 86 in the local MMI 80 has a direct connection via line 87 to receive analog signals from the detector supply unit 66 which can be output in graphical form by the printer/recorder 86 during a flux mapping operation.

Except for the ability to output analog data in the preferred embodiment, a flux mapping operation can be controlled from the remote MMI 92 in a manner similar to that described above. An additional analog connection could be provided from the detector supply unit 66 to the printer/recorder 100 so that the operation could be identical from the remote MMI 92. However, the remote MMI 92 is more likely to be used for other operations described below. Any of the operations described below can be performed by the local MMI 80, but will be described as being performed from the remote MMI 92.

One of the purposes for storing a plurality of flux map sequences in the memory expansion unit 114 is to enable a reactor engineer to develop flux map sequences which map all or part of the reactor core 12 in a desired order. For example, it is often desired to map only one quadrant of the reactor core 12. According to the present invention one or more quandrant core map sequences can be stored in the memory expansion unit 114. The present invention also provides another way of obtaining a map of only a portion of the core. When the flux map sequence is displayed on the CRT monitor 84 and 98, the operator at the enabled MMI may specify starting and stopping points so that a specified portion of the displayed flux map sequence can be selected. The specified portion is a modified flux mapping sequence which may be used to control a flux mapping operation or stored in the memory expansion unit 114. Similarly, modifications to the order of thimbles may be made to produce a modified flux mapping sequence, as desired by the reactor engineer.

One of the most important ways in which the flux mapping sequence can be modified is to delete one of the detector drivers from use during a flux mapping operation. If one of the detector drivers is unoperational, the remaining detector drivers can be used to perform a flux mapping operation, even a flux map covering the entire reactor core 12. This is accomplished by a program executing in the host processor 110 following the procedure indicated in the flowchart illustrated in FIG. 6A.

Figure 6A:
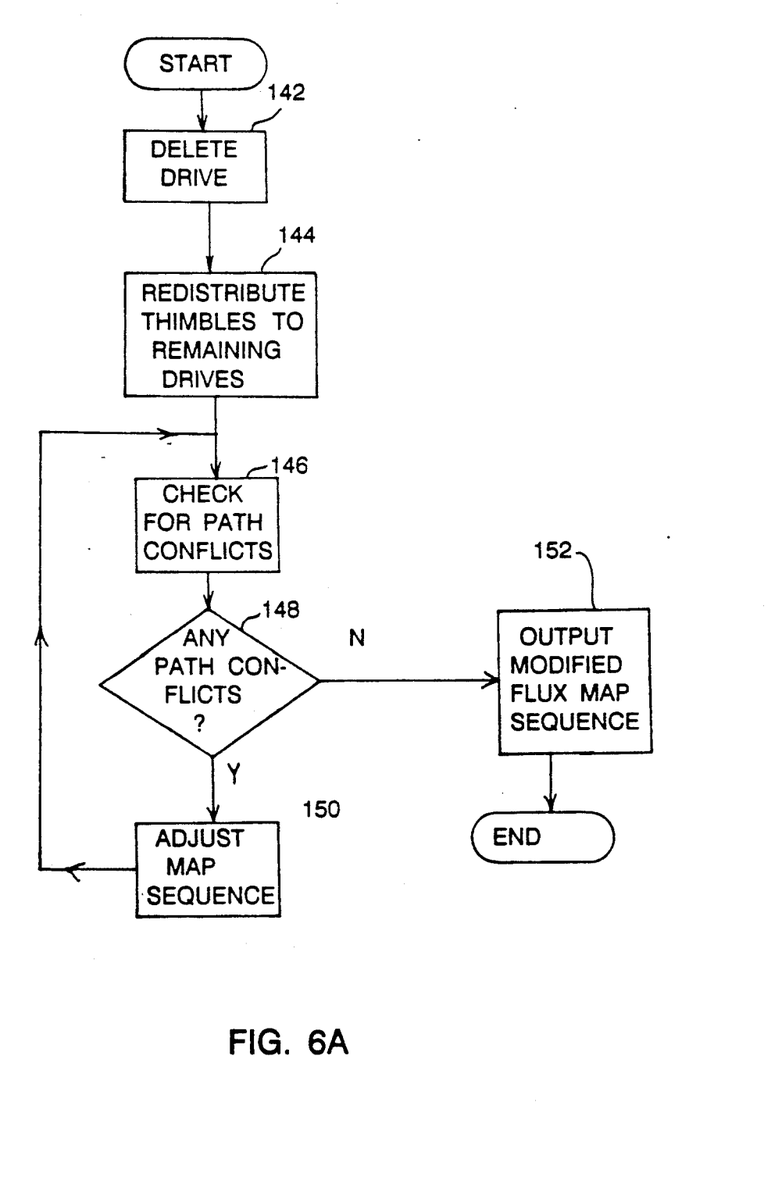
FIGS. 6A and 6B are a flowchart of an efficient mapping algorithm used by the flux mapping system according to the present invention.

As illustrated in FIG. 6A, the operator inputs an instruction to delete 142 a drive in the displayed flux map sequence. The host processor 110 redistributes 144 the thimbles previously assigned to the deleted drive to the remaining drives. The resulting modified flux map sequence is then checked 146 for path conflicts. If 148 any path conflicts are found, the modified flux map sequence is adjusted 150 and the adjusted map sequence is checked for path conflicts in step 146. The adjustment of the modified flux map sequence in step 150 may be performed by requesting the operator to further modify the flux map sequence after identifying conflicting paths, or an algorithm or artificial intelligence program may be used to perform the adjustment in step 150. When no more path conflicts are detected 148, the modified flux map sequence is output 152.

The redistribution 144 of thimbles, originally assigned to the deleted drive, to the remaining drives is preferably accomplished by moving equal portions of the deleted drive's thimbles to be used by corresponding portions of the remaining drives. For example, assume that thimbles A-X are to be mapped using drives 1-4 in the order illustrated in Table 1 below. Thus, on the first pass, detector 1 will be in thimble A, detector 2 will be in thimble G, detector 3 will be in thimble M and detector 4 will be in thimble S.

TABLE 1

|  | DRIVES | | | |
|---|---|---|---|---|
|  | 1 | 2 | 3 | 4 |
| THIMBLES | A | G | M | S |
|  | B | H | N | T |
|  | C | I | O | U |
|  | D | J | P | V |
|  | E | K | Q | W |
|  | F | L | R | X |

If drive 4 is deleted, thimbles S-X need to be assigned to drives 1-3. According to the preferred embodiment, drive 1 will insert its detector in thimbles S and T on the first and second passes, drive will insert its detector in thimbles U and V on the third and fourth pass and drive 3 will insert its detector in thimbles W and X on the fifth and sixth pass. Modifications to this scheme within the scope of the present invention include moving, e.g., two, thimbles to the end to make room for the deleted drive's thimbles, so that drive 1's sequence would be S, T, C, D, E, F, A, B, waiting until, e.g., the second or third pass to begin inserting detectors into the thimbles originally assigned to the deleted drive, etc. The result of this procedure is a flux map sequence as indicated in Table 2 below.

TABLE 2

|  | DRIVES | | | |
|---|---|---|---|---|
|  | 1 | 2 | 3 | 4 |
| THIMBLES | S | G | M |  |
|  | T | H | N |  |
|  | A | U | O |  |
|  | B | V | P |  |
|  | C | I | W |  |
|  | D | J | X |  |
|  | E | K | Q |  |
|  | F | L | R |  |

Figure 6B:
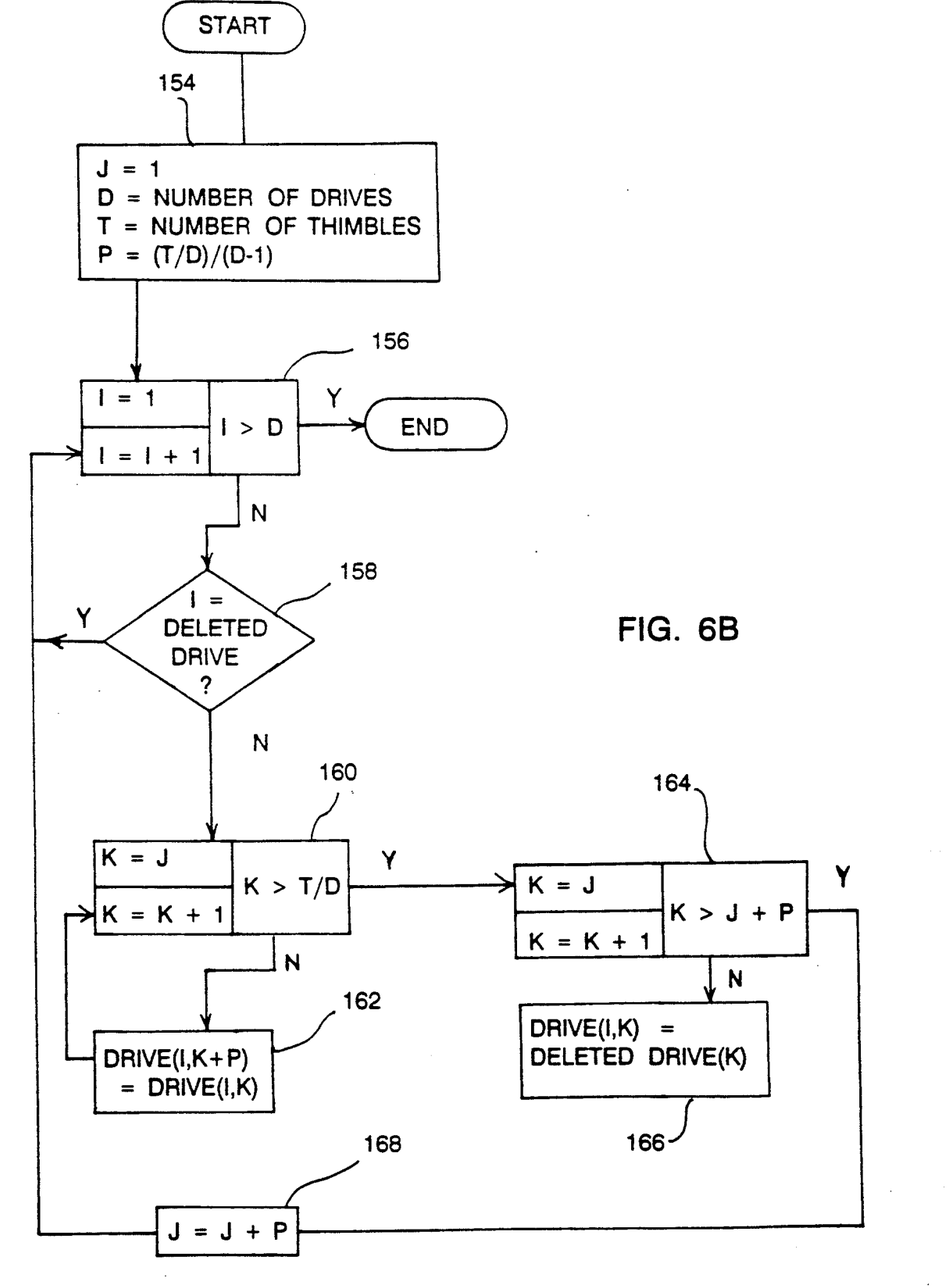

A flowchart of the above-described procedure is illustrated in FIG. 6B where the array DRIVE(I, J) is the array represented in Tables 1 and 2 where I is the drive number and J is the pass number. First, variables are initialized 154 including P which is the number of passes in the deleted drive which must be inserted into each of the remaining drives. A loop of drives is established 156 and the deleted drive is skipped 158 since no thimbles will be assigned to the deleted drive. Another loop is established 160 to move 162 the thimble assignments in the drive array being modified to make room for the thimble assignments in the deleted drive. When this is completed another loop is established 64 to transfer 166 the thimble assignments from the drive array for the deleted drive to the drive array being modified. Then an index J is incremented 168 by the number of passes P which are transferred from the deleted drive's array to each array of the remaining drives.

In addition to flux map sequence modification, the MMIs 80, 92 can be used to perform other operations. For example, the flux map data received from the host controller via the communication coprocessors 82, 96 can be applied to conventional "incore" programs which are conventionally run on separate mainframe or minicomputers to analyze flux map data. As a result, in prior art systems, the flux map data had to be transferred to a medium, such as magnetic tape, which was then physically transported to the location of the mainframe or minicomputer. Similarly, plant protection system calibration programs which utilize the output of the incore analysis can be automated and executed on either of the MMIs 84, 92.

In addition, the operator of a flux mapping system according to the present invention is preferably able to modify tolerances and limits of the flux mapping system. As discussed above, in the prior art such tolerances and limits were typically hard-coded into the flux mapping system's control program and thus warnings would sometimes be generated or the flux mapping system would be prevented from operating, just because a tolerance or limit was slightly exceeded. In the preferred embodiment, the operator is able to request via the keyboard 88 or 102 that limits and tolerances be displayed on the CRT monitor 84 and 98. Instructions can then be input to adjust one or more of the limits and tolerances. Thus, limits and tolerances can be adjusted such as maximum allowable time period between changes in detector position while detectors are in motion, overspeed and underspeed tolerances for the detectors, offset tolerance for a position signal produced when a signal is received indicating presence of one of the detectors at a fixed position, such as the withdraw limit switches 42, control rod movement alarm tolerance and default positions of the control rods.

The many features and advantages of the present invention are apparent from the detailed specification, and thus it is intended by the appended claims to cover all such features and advantages of the system which fall within the true spirit and scope of the invention. Further, since numerous modifications and changes will readily occur to those skilled in the art from the disclosure of this invention, it is not desired to limit the invention to the exact construction and operation illustrated and described. Accordingly, suitable modifications and equivalents may be resorted to, all falling within the scope and spirit of the invention.

What is claimed is:

1. A computer system for controlling a physical process performed by devices, comprising:
    host control means, including a host processor, for inputting and outputting signals, including outputting automated control signals to the devices performing the physical process and inputting process data signals representing conditions related to the physical process;
    local operator interface means, disposed in physical proximity to said host control means, for inputting local operator instructions from a local operator and shared data signals included in the signals output by said host control means and for outputting the operator instructions to said host control means and display data, included int he shared data, to the local operator;
    remote operator interface means, separate from said host control means and said local operator interface means, for inputting remote operator instructions from a remote operator and the shared data signals and for outputting the remote operator instructions to said host control means and the display data to the remote operator; and
    diagnostic processor means, operating independently from said host processor, for detecting unacceptable temperature and power levels and logic failures in said host control means and for sending safety shutdown control signals to the devices via said system control means when any of the unacceptable temperature and power levels and the logic failures are detected.

2. A computer system as recited in claim 1, further comprising interface means for interfacing said host and manual control means with the devices, and
    wherein at least one of said local and remote operator interface means comprises:
    processor means, operatively connected to said host control means for controlling operation of the at least one of said local and remote operator interface means; and
    output means, operatively connected to said processor means and said interface means, for outputting digital output data included in the shared data received from said host control means via said processor means and analog data received from said interface means.

3. A computer system as recited in claim 2, wherein said output means comprises:
    a cathode ray tube monitor, operatively connected to said processor means, for outputting the digital output data including graphical data, formatted by said processor means, representing conditions in the physical process; and
    a printer/plotter for outputting the analog data from said interface means under control of said processor means and the digital output data including images on said cathode ray tube monitor.

4. A computer system for controlling flux mapping of a nuclear reactor using flux mapping instrumentation, including neutron flux detectors mounted on cables driven by detector drivers into thimbles selected by selectors, comprising:
    host control means for inputting and outputting signals, including outputting automated control signals to the devices performing the physical process and inputting process data signals representing conditions related to the physical process, said host control means including—
    host processor means for controlling operation of said host control means;
    nonvolatile memory means for storing a plurality of flux map sequences accessed one at a time by said host processor means to generate selector control signals included in the automated control signals and used to control the selectors during a flux mapping operation; and
    host input/output means for communicating between said host processor and the flux mapping instrumentation;
    local operator interface means, disposed in physical proximity to said host control means, for inputting local operator instructions from a local operator and shared data signals included in the signals output by said host control means and for outputting the operator instructions to said host control means and display data, included in the shared data, to the local operator;
    remote operator interface means, separate from said host control means and said local operator interface means, for inputting remote operator instructions from a remote operator and the shared data signals and for outputting the remote operator instructions to said host control means and the display data to the remote operator, said local and remote operator interface means each including—
    one of local and remote processor means for controlling operation of said local and remote operator interface means, respectively;
    shared data communication means for communicating between said host input/output means and one of said local and remote processor means; and
    operator input/output means for receiving the local and remote operator instructions, respectively, including instructions selecting one of the flux map sequences for a flux mapping operation and for displaying operator output data formatted by one of said local and remote processor means; and
    system control means for permitting only one of the local and remote operator instructions to be received by said host control means at any given time.

5. A computer system as recited in claim 4, wherein at least one of said local and remote operator interface means further comprises program storage means for storing a program, executable by a corresponding one of said local and remote processors for analyzing flux map data output by the detectors and included in the shared data.

6. A computer system as recited in claim 4, wherein said system control means supplies the automated control signals from said host control means to the detector drivers and selectors to control flux mapping operations and said system control means comprises:
    manual control means for generating manual control signals for controlling the detector drivers and the selectors; and
    switching means for selecting only one of local, remote and manual operation modes at a given time, said host control means receiving the local and remote instructions and outputting the automated control signals to the detector drivers and the selectors in the local and remote modes, respectively, and the detector drivers receiving the manual control signals from said manual control means in the manual control mode.

7. A computer system as recited in claim 4, wherein the nuclear reactor has a plant protection system, and
wherein at least one of said local and remote operator interface means further comprises:
program storage means for storing a program, executable by a corresponding one of said local and remote processor means, which generates calibration data from the plant protection system from flux map data, included in the shared data; and
data transfer means for transferring the calibration data to the plant protection system.

8. A method for controlling flux mapping of a nuclear reactor, comprising the steps of:
(a) storing a plurality of flux map sequences in non-volatile memory;
(b) selecting one of the flux map sequences utilizing the steps of:
(b1) receiving local instructions from a local operator;
(b2) receiving remote instructions from a remote operator;
(b3) receiving an instruction selection signal indicating that only one of the local and remote instructions is to be used for controlling of the flux mapping operation;
(b4) selecting the one of the flux map sequences in dependent upon said receiving in steps (b1)–(b3);
(c) displaying the one of the flux map sequences selected in step (b);
(d) receiving instructions modifying the one of the flux map sequences; and
(e) modifying the one of the flux map sequences to produce a modified flux map sequence in dependence upon the instructions received in step (d);
(f) wherein said controlling the flux mapping operation in step (b3) is in dependence upon the one of the flux map sequences selected in step (b) and modified in step (e).

9. A method as recited in claim 8, further comprising the steps of:
(g) displaying limits and tolerances for the flux mapping operation;
(h) receiving instructions adjusting at least one of the tolerances;
(i) adjusting at least one of the limits and tolerances in dependence upon the instructions received in step (h); and
(j) storing the at least one of the limits and tolerances adjusted in step (i).

10. A method as recited in claim 9, wherein said displaying and adjusting in steps (g) and (i) include displaying and adjusting at least one of the maximum allowable time period between changes in detector position while the detectors are in motion, overspeed and underspeed tolerances for the detectors, an offset tolerance for a position signal produced when a signal is received indicating presence of one of the detectors at a fixed position, a control rod movement alarm tolerance and a default position of control rods.

11. A method as recited in claim 8, wherein said storing in step (a) comprises the steps of:
(a1) storing the flux map sequences in a electrically erasable programmable read only memory; and
(a2) backing up the electrically erasable programmable read only memory on a removable magnetic medium.

12. A method as recited in claim 11, further comprising the step of (g) storing the modified flux map sequence in the electrically erasable programmable read only memory.

13. A method as recited in claim 8,
wherein step (e) includes specifying starting and stopping points of a specified portion of the one of the flux map sequences selected in step (b), and
wherein said modifying in step (e) produces the modified flux map sequence as the specified portion of the one of the flux map sequences selected in step (b).

14. A method as recited in claim 8, wherein the flux mapping operation is performed using neutron flux detectors mounted on cables driven by detector drivers into thimbles selected by selectors,
wherein said receiving in step (d) includes receiving instructions deleting one of the detector drivers from the flux mapping sequence, and
wherein said modifying in step (e) comprises the steps of:
(e1) redistributing the thimbles to be mapped by the detector drivers remaining after the deleting instructed in step (d) to produce the modified flux map sequence;
(e2) checking the modified flux map sequence for path conflicts between the detector drivers;
(e3) adjusting the modified flux map sequence for any conflicts found in step (e2); and
(e4) repeating steps (e2) and (e3) until no conflicts are found in step (e2).

15. A method as recited in claim 14, wherein the detector drivers include first, second, third, and fourth drivers, and
wherein said redistributing in step (e1) comprises the further steps of:
(e1a) assigning the first driver an initial third of the thimbles originally assigned to the fourth driver to be used for mapping prior to the thimbles originally assigned to the first driver;
(e1b) assigning the second driver a middle third of the thimbles originally assigned to the fourth driver to be used for mapping after the initial third of the thimbles originally assigned to the fourth driver are mapped by the first driver; and
(e1c) assigning the third driver a final third of the thimbles originally assigned to the fourth driver to be used for mapping after the middle third of the thimbles originally assigned to the fourth driver are mapped by the second driver.

* * * * *